United States Defensive Publication [19] (H) [11] T962,006
Pacifici et al. [43] Sept. 6, 1977

[54] PHOTOPOLYMERIZABLE POLYMERIC COMPOSITIONS CONTAINING AROMATIC DIACRYLATES

[76] Inventors: James G. Pacifici, Rte. 16, Heatherwood; Raymond D. Clark, 532 Dogwood Drive, both of Kingsport, Tenn. 37663; Gordon C. Newland, 1917 E. Sevier Ave., Kingsport, Tenn. 37664

[21] Appl. No.: 757,180

[22] Filed: Jan. 6, 1977

Related U.S. Application Data

[63] Continuation of Ser. No. 653,808, Jan. 30, 1976, abandoned.

[51] Int. Cl.[2] ..... C08F 2/46

[52] U.S. Cl. ..... 204/159.23; 204/159.12; 204/159.15; 260/17 A; 427/54; 428/439; 428/442; 526/320; 526/321; 526/324; 526/325; 560/70; 560/86

[57] ABSTRACT

The invention relates to photopolymerizable polymeric compositions useful as coating and moldable compositions which are hardenable by ultraviolet radiation. These coating and moldable compositions comprise mixtures of photopolymerizable or photocrosslinkable acrylates of bis-(hydroxyalkyl) terephthalates and isophthalates in combination with at least one ethylenically unsaturated monomer component and a photoinitiator.

13 Claims, No Sheets Drawing,

16 Pages Specification

The file of this unexamined application may be inspected and copies thereof may be purchased (849 O.G. 1221, Apr. 9, 1968).